United States Patent
Benedict et al.

(10) Patent No.: US 11,038,231 B2
(45) Date of Patent: Jun. 15, 2021

(54) BATTERY PACK ARRAY RETENTION

(71) Applicant: FORD GLOBAL TECHNOLOGIES, LLC, Dearborn, MI (US)

(72) Inventors: Scott Benedict, Plymouth, MI (US); Brent Zapczynski, Garden City, MI (US); Michael Reibling, Sterling Heights, MI (US); Eid Farha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1366 days.

(21) Appl. No.: 15/006,094

(22) Filed: Jan. 25, 2016

(65) Prior Publication Data
US 2017/0214012 A1 Jul. 27, 2017

(51) Int. Cl.
*H01M 50/20* (2021.01)
*H01M 10/04* (2006.01)

(52) U.S. Cl.
CPC .......... *H01M 50/20* (2021.01); *H01M 10/04* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2,567,483 A | * | 9/1951 | Hotine | F16B 33/02 33/813 |
| 6,265,091 B1 | * | 7/2001 | Pierson | H01M 2/10 320/104 |
| 2007/0087266 A1 | * | 4/2007 | Bourke | H01M 2/0242 429/159 |
| 2013/0084481 A1 | * | 4/2013 | Yoon | H01M 2/1077 429/99 |
| 2013/0164592 A1 | | 6/2013 | Maguire et al. | |
| 2014/0295227 A1 | * | 10/2014 | Aoki | H01M 2/1016 429/82 |

FOREIGN PATENT DOCUMENTS

| | | | |
|---|---|---|---|
| CN | 1259229 | 7/2000 | |
| CN | 101326657 | 12/2008 | |
| JP | 2005332879 | 12/2005 | |
| JP | 2008306048 | 12/2008 | |
| JP | 2010153128 | 12/2013 | |
| WO | WO-2011096160 A1 * | 8/2011 | H01M 2/0404 |
| WO | 2013146561 | 10/2013 | |

OTHER PUBLICATIONS

Ota, WO2011096160A1 Machine Translation, 2011 (Year: 2011).*

* cited by examiner

*Primary Examiner* — Ula C Ruddock
*Assistant Examiner* — Anna Korovina
(74) *Attorney, Agent, or Firm* — David Kelley. Esq.; Carlson, Gaskey & Olds, P.C.

(57) ABSTRACT

An exemplary battery assembly includes an endwall, an endplate, and a flange secured within a recess to secure the endwall relative to the endplate. One of the endwall or the endplate provides the flange, and the other of the endwall or the endplate provides the recess.

17 Claims, 5 Drawing Sheets

BATTERY PACK ARRAY RETENTION

TECHNICAL FIELD

This disclosure relates generally to securing a battery array and, more particularly, to securing the battery array within a battery pack enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction batteries of electrified vehicles can include a battery pack having several individual battery arrays within a battery pack enclosure. The battery arrays each typically include multiple individual battery cells sandwiched between endplates. Securing the battery arrays within the battery pack enclosure can require significant packaging space.

SUMMARY

A battery assembly according to an exemplary aspect of the present disclosure includes, among other things, an endwall, an endplate, and a flange secured within a recess to secure the endwall relative to the endplate. One of the endwall or the endplate provides the flange. The other of the endwall or the endplate provides the recess.

In a further non-limiting embodiment of the foregoing assembly, the endwall provides the recess and the endplate provides the flange.

In a further non-limiting embodiment of any of the foregoing assemblies, the assembly includes a fastener that secures the flange within the recess of the endplate or the endwall. The fastener extends from the flange through an unthreaded bore within the other of the endwall or the endplate.

In a further non-limiting embodiment of any of the foregoing assemblies, the fastener holds a cover or a tray of a battery pack enclosure against the endwall.

In a further non-limiting embodiment of any of the foregoing assemblies, the fastener is threadably secured directly to the flange.

In a further non-limiting embodiment of any of the foregoing assemblies, the fastener is threadably secured directly to a threaded bore within the other of the endwall or the endplate.

In a further non-limiting embodiment of any of the foregoing assemblies, the fastener extends through an aperture in the flange from a first side of the flange to an opposite, second side of the flange.

In a further non-limiting embodiment of any of the foregoing assemblies, the endwall is part of a battery enclosure, and the endplate is a first endplate that sandwiches an array of battery cells together with a second endplate to provide a battery array. The battery enclosure provides an open area to receive the battery array.

In a further non-limiting embodiment of any of the foregoing assemblies, the battery enclosure holds the battery array and a plurality of other battery arrays.

A method of securing a battery array within a battery pack enclosure according to an exemplary aspect of the present disclosure includes, among other things, securing a flange within a recess. An endplate of the battery array provides one of the flange or the recess, and an endwall of the battery pack enclosure provides the other of the flange or the recess.

In a further non-limiting embodiment of the foregoing method, the endwall provides the recess and the endplate provides the flange.

In a further non-limiting embodiment of any of the foregoing methods, the method includes securing the flange using a fastener, and accessing the fastener during the securing from a position outside the battery pack enclosure.

In a further non-limiting embodiment of any of the foregoing methods, the method includes using the fastener to move the flange against a side of the recess during the securing.

In a further non-limiting embodiment of any of the foregoing methods, the method includes threadably securing the fastener directly to the flange during the securing.

In a further non-limiting embodiment of any of the foregoing methods, the method includes threadably securing the fastener to the endplate if the endplate provides the recess, and threadably securing the fastener to the endwall if the endwall provides the recess.

In a further non-limiting embodiment of any of the foregoing methods, the fastener extends through an aperture in the flange from a first side of the flange to an opposite, second side of the flange.

In a further non-limiting embodiment of any of the foregoing methods, the fastener extends through an open bore in the endwall if the recess is in the endwall, and the fastener extends through an open bore in the endplate if the recess is in the endplate.

In a further non-limiting embodiment of any of the foregoing methods, the method includes securing a cover and a floor of the battery pack enclosure to the endwall prior to securing the flange within the recess.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to securing battery arrays within an enclosure of a battery pack. The securing techniques disclosed herein utilize relatively little packaging space.

Figure 1:
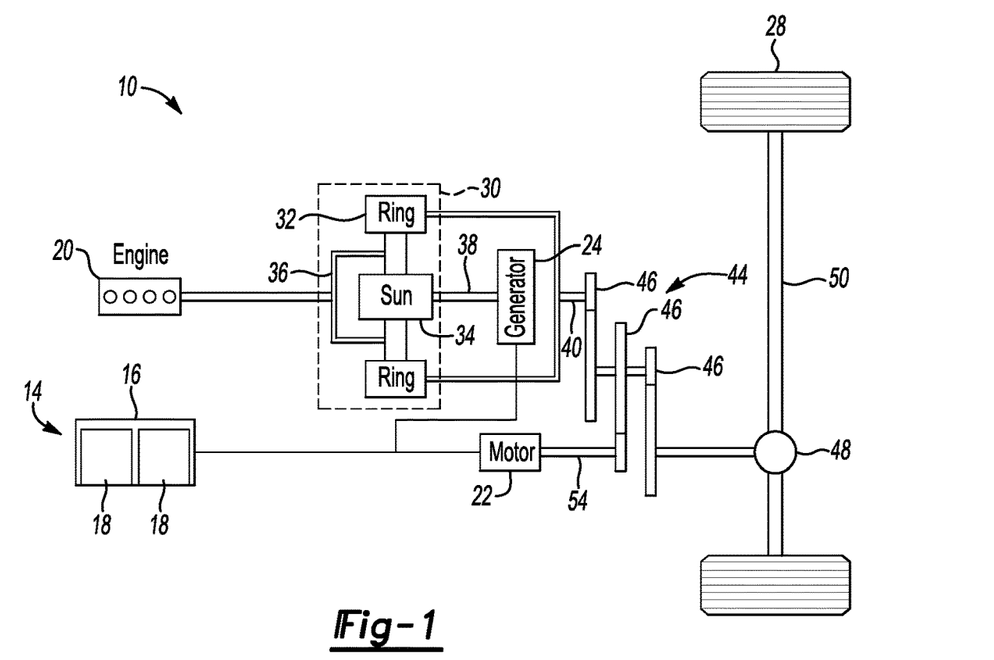
FIG. 1 shows an example electrified vehicle powertrain.

Referring to FIG. 1, a powertrain 10 of a hybrid electric vehicle (HEV) includes a battery pack 14 including an enclosure 16 housing a plurality of battery arrays 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
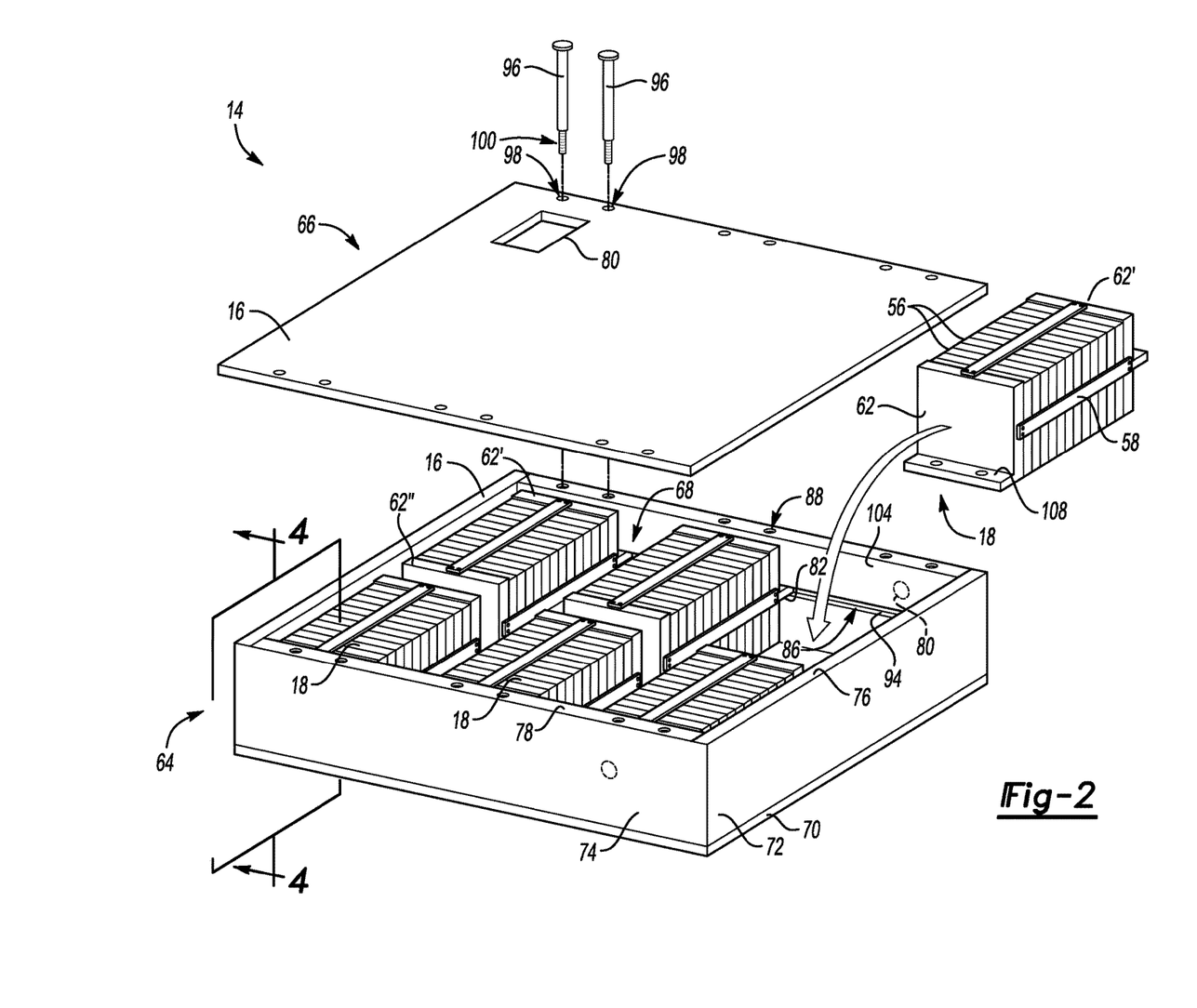
FIG. 2 shows a perspective, partially exploded view of an example battery pack from the powertrain of FIG. 1.

Referring now to FIG. 2 with continuing reference to FIG. 1, the example battery pack 14 includes six of the battery arrays 18 within the enclosure 16. The example battery arrays 18 are arranged in a 2×3 grid pattern. Other example battery packs could include other numbers of battery arrays 18 and other grid patterns.

Each of the exampled battery arrays 18 includes battery cells 56, support arms 58, and a pair of endplates 62. Opposing ends of the support arms 58 are attached to the endplates 62 to hold the position of the endplates 62 relative to each other. The battery cells 56 are clamped and sandwiched between the endplates 62. Each of the example battery arrays 18 includes from ten to fifteen individual battery cells 56. Other example battery arrays could include less than ten battery cells or more than fifteen battery cells. Further, other example battery arrays could use structures other than the support arms 58 to hold the positions of the endplates 62. Straps, for example, could loop around the endplates 62 to hold the endplates 62 against the battery cells 56.

The enclosure 16 includes a tray 64 and a lid 66. The enclosure 16 provides an open area 68 or chamber that receives the battery arrays 18. The open area 68 can house other components in addition to the battery arrays 18, such as, for example, battery control modules, busbars, electrical connectors, etc.

The tray 64 includes a floor 70, sidewalls 72, and endwalls 74. The sidewalls 72 and the endwalls 74 extend upwardly from the floor 70 in this example. In another example, the sidewalls 72 and the endwalls 74 could extend downwardly from the lid 66.

The sidewalls 72 and endwalls 74 can be molded or cast with the floor 70 such that the tray 64 is a single unitary structure. The sidewalls 72 and endwalls 74 could instead be separate from the floor 70, and secured to the floor 70 using, for example, adhesive, fasteners, welds, or some combination of these.

If the sidewalls 72 or endwalls 74 are separate from the floor 70, the sidewalls 72 or endwalls 74 can be extruded. The sidewalls 72 and endwalls 74 can be an extruded metallic material, for example.

The lid 66 is configured to abut surfaces 76 of the sidewalls 72 and surfaces 78 of endwalls 74 to enclose the open area 68. The example surfaces 76 and 78 face upwardly in this example.

The enclosure 16 can include ports 80 for electrically connecting the battery arrays 18 to components of the powertrain 10. The ports 80 could provide access for thermal management components, such as conduits that carry a coolant fluid to and from the battery arrays 18 within the open area 68. The positioning of the ports can depend on where the battery pack 14 is secured within the HEV.

The enclosure 16 can be secured within the HEV when the battery arrays 18 are positioned within the open area 68 and the lid 66 is secured to the tray 64. The battery pack 14 can be, for example, secured within a trunk compartment or beneath passenger seats of the HEV. In other examples, the enclosure 16 can be secured to an underbody of the HEV.

Although the battery pack 14 is described in connection with a HEV, the battery pack 14 could be incorporated into other types of electrified vehicles.

The enclosure 16, among other things, protects the battery arrays 18 and provides a barrier to guard against inadvertent or unwanted access. Stabilizing the battery arrays 18 within the open area 68 is often required to ensure that the position of the battery arrays 18 is maintained, especially during HEV operation. The example battery pack 14 incorporates features used to secure the battery arrays 18 within the open area 68 of the enclosure 16.

Figure 3:
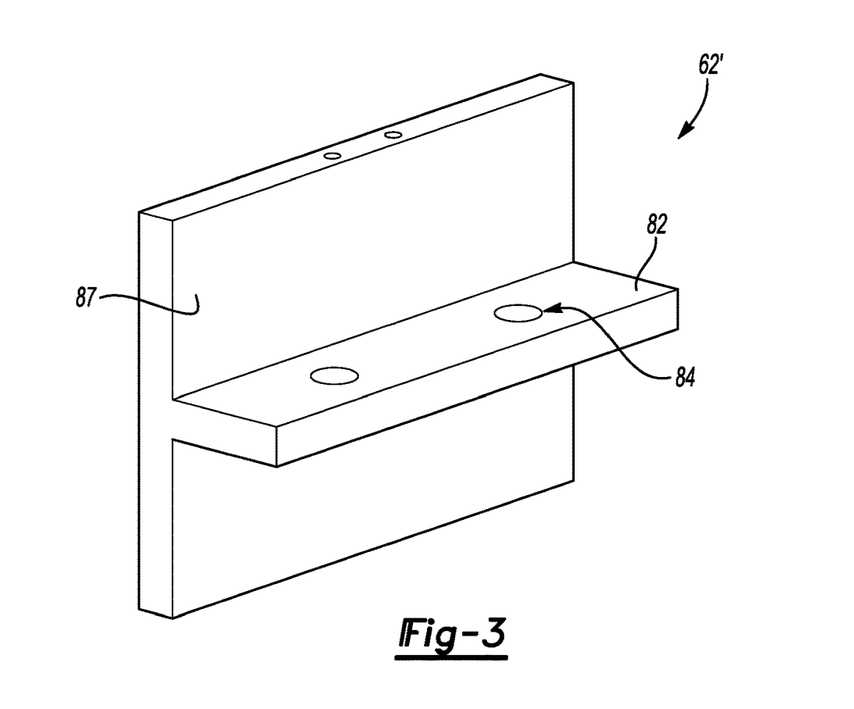
FIG. 3 shows a perspective view of an example endplate from a battery array of the battery pack of FIG. 2.
Figure 4:
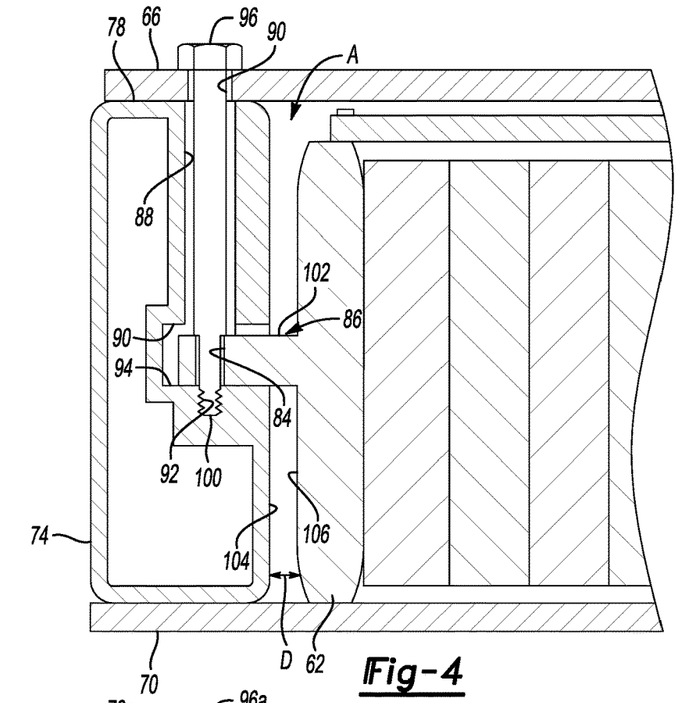
FIG. 4 shows a section view at line 4-4 in FIG. 2.

Referring now to FIGS. 3 and 4 with continuing reference to FIG. 2, the endplates 62' interface with the endwalls 74. The endplates 62' incorporate a flange 82 having apertures 84. When the battery arrays 18 are positioned within the open area 68 in an installed position, the flange 82 is received within a recess 86 provided by the endwall 74. The flange 82 of the endplate 62' and the recess 86 of the endwall 74 provide a battery assembly.

The flange 82 extends transversely from a primary portion 87 of the endplate 62', which interfaces directly with the battery cells 58. The flange 82 could also take many forms including a cylindrical pin, a tapered wedge, or some other form capable of being received within a recess. The flange 82 could be formed together with the primary portion 87 of the endplate 62', or could be a separate structure that is secured directly to the primary portion 87.

The recess 86 could take many forms, including, but not limited to a slot, a shelf, a ledge, or a cylindrical opening. The area of the endwall 74 providing the recess 86 could be formed together with the remaining portions of the endwall 74, or could be a separate structure that is secured directly to the remaining portions of the endwall.

The endwall 74 includes an open or unthreaded bore 88 or through-hole extending from the surface 78 to a first side 90 of the recess 86. The endwall 74 includes a threaded bore 92 extending from a second side 94 of the recess 86. The first side 90 is an upper side that opposes the second, lower side 94 in this example.

To secure the battery array 18 within the open area 68, a fastener 96 is inserted through an opening 98 in the lid 66 into the unthreaded bore 88 and through one of the apertures 84 in the flange 82. The fastener 96 is a bolt in this example. In another example, the fastener is a threaded rod, or another type of mechanical fastener.

The fastener 96 extends through the one of apertures 84 from a first side of the flange 82 to an opposite, second side of the flange 82. The fastener 96 is then rotated to threadably engages a threaded end 100 of the fastener 96 with the threaded bore 92. The fastener 96 is a mechanical fastener in this example.

As the fastener 96 is turned to engage the threaded bore 92, a shoulder 102 of the fastener 96 presses against the flange 82, which forces the flange 82 against the side 94 of the recess 86. The unthreaded bore 88 is oversized relative to a shaft of the fastener 96 to permit the shoulder 102 of the fastener 94 to draw downward against the flange 82 when the fastener 96 is tightened into the threaded bore 92.

Tightening the fastener 96 into the threaded bore 92 secures and holds the flange 82 against the side 94. Securing the flange 82 against the second side 94 stabilizes the endplate 62' to help hold a position of the respective battery array 18 within the open area 68 of the enclosure 16.

Since the shoulder 102 bottoms out the fastener 96 against the flange 82, the fastener 96 may not, in some examples, tightly secure the lid 66 against the surface 78 of the endwall 74. Thus, additional fasteners or attachments may be required to secure the lid 66 to the surface 78 of the endwall 74.

Notably, the attachment of the endplate 62' to the endwall 74 occurs within a lateral periphery of the endwall 74. That is, the fastener 96 engages the threaded bore 92 inside or beyond an inwardly facing surface 104 of the endwall 74. Attaching the endplate 62' to the endwall 74 at such a location requires less lateral packaging space than if the attachment were positioned between the inwardly facing surface 104 of the endwall 74 and an outwardly facing surface 106 of the endplate 62'. A distance D between the endwall 74 and the endplate 62' can thus be reduced since an area A between the inwardly facing surface 104 of the endwall 74 and the outwardly facing surface 106 of the endplate 62' does not need to accommodate the fastener 96 and related features.

The endplates 62' that are positioned away from the endwalls 74 toward the central area of the battery pack 14 can be secured directly to the floor 70 via a foot 108 or flange extending from the endplates 62'. It is to be appreciated that battery pack 14, in another exemplary embodiment, could include an additional wall disposed along the central area and defining a recess similar to the recess 86 of the endwall 74. The battery array 18 could then include the endplate 62' with the flange 82 such that the flange 82 is received within the recess provided by the additional wall along the central area of the battery pack 14 to secure the battery array 18 along the central area of the battery pack 18.

Figure 5:
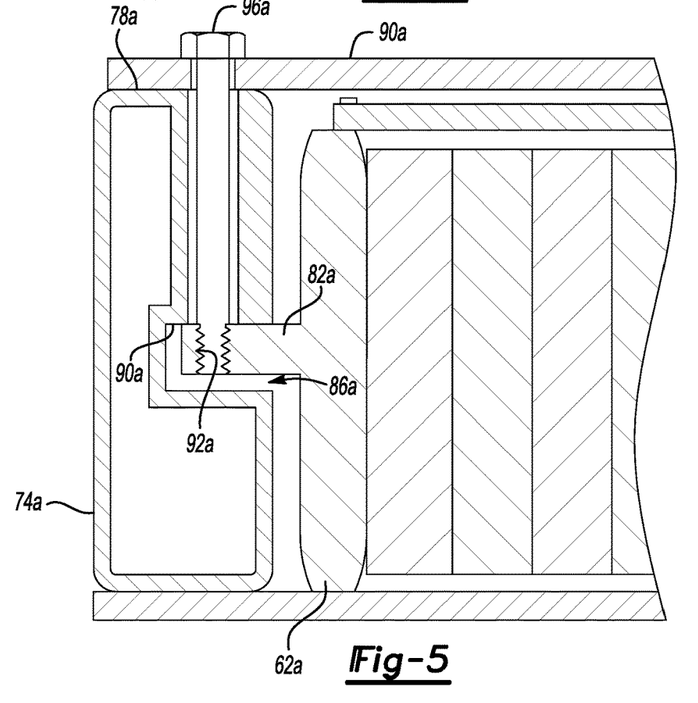
FIG. 5 shows a section view at the position of line 4-4 of a battery pack according to another exemplary embodiment.

Referring to FIG. 5, another exemplary embodiment includes a fastener 96a that engages a threaded bore 92a within a flange 82a extending from an endplate 62a. Rotating the fastener 96a into the threaded bore 92a draws the flange 82a against a side 90a of a recess 86a of an endwall 74a to stabilize the endplate 62a relative to the endwall 74a. Tightening the fastener 96a into the threaded bore 92a also pulls a lid 66a downwardly against a surface 78a of an endwall 74a. Thus, in the embodiment of FIG. 5, secondary fasteners may not be required to secure the lid 66a against the surface 78a of the endwall 74a.

Notably, in at least the embodiments of FIGS. 4 and 5, the array 18 can be secured within the open area 68 after the lid 66 is secured to the tray 64.

Figure 6:
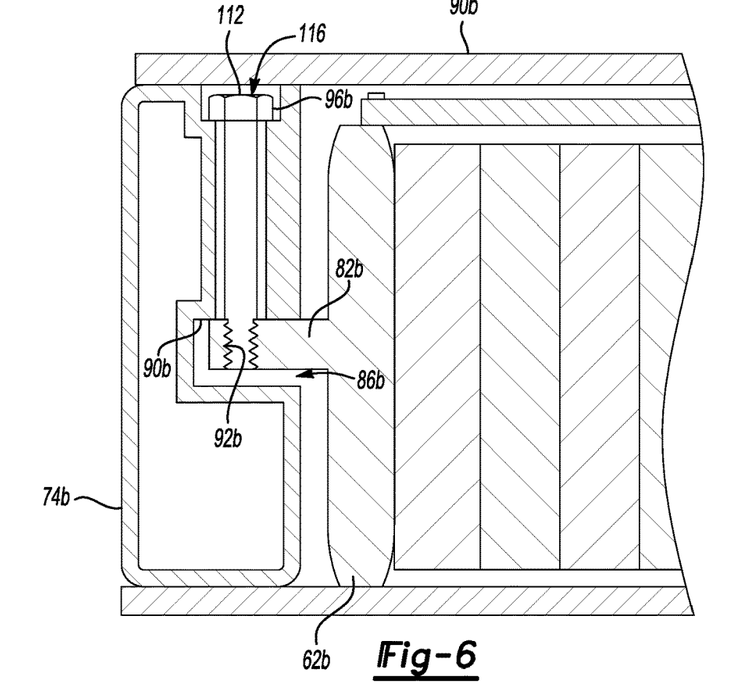
FIG. 6 shows a section view at the position of line 4-4 of a battery pack according to yet another battery pack embodiment.

Referring to FIG. 6, another exemplary embodiment includes a fastener 96b that engages a threaded bore 92b within a flange 82b extending from an endplate 62b. Rotating the fastener 96b draws the flange 82b against a side 90b of a recess 86b of an endwall 74b. Notably, the fastener 96b includes a head 112 held within an area 116 that is subflush from surrounding areas of a surface 78b of the endwall 74b. The head 112 is thus countersunk within the area 116, which permits a lid 66b to lie flush against the surface 78b. The lid 66b can be attached to the surface 78b using secondary fasteners or another type of attachment.

The embodiment of FIG. 4 could also position the head of its fastener 96 with a subflush area similar to the embodiment of FIG. 6.

Figure 7:
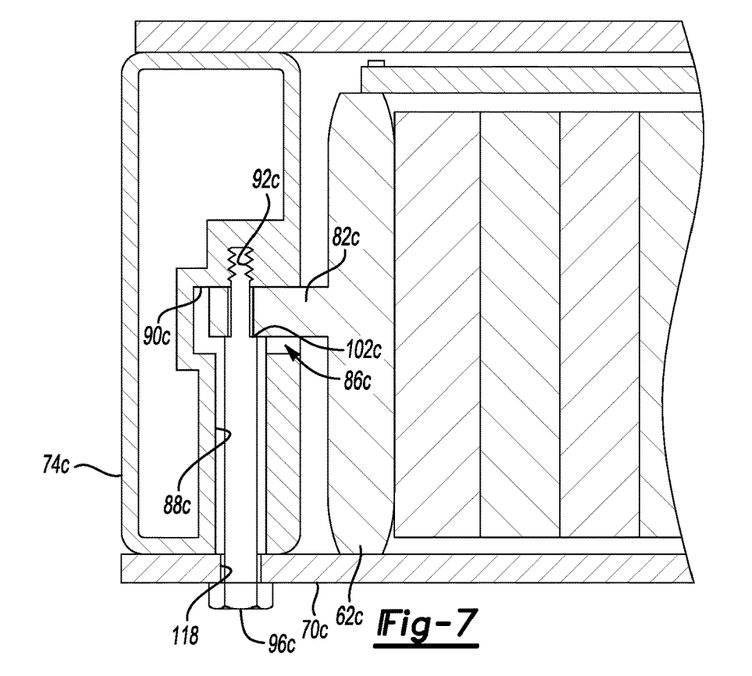
FIG. 7 shows a section view at the position of line 4-4 of a battery pack according to yet another battery pack embodiment.

Referring to FIG. 7, another exemplary embodiment includes a fastener 96c that engages a threaded bore 92c extending from a side 90c of a recess 86c within an endwall 74c. The fastener 96c extends through an open or unthreaded bore 88c to the threaded bore 92c. As the fastener 96c is tightened into the threaded bore 92c, a shoulder 102c of the fastener 96c forces a flange 82c extending from an endplate 62c' against the side 90c of the recess 86c. Notably, the fastener 96c extends through an opening 188 in a floor 70c to the unthreaded bore 88c, and then to to the recess 86c and the threaded bore 92c.

The fastener 96c of the embodiment of FIG. 7 could, in some examples, not hold the floor 70c. The fastener 96c could, for example have its head positioned within an area of the endwall 74c that is subflush the surrounding areas. The heads could thus be positioned similarly to the embodiment of FIG. 6 but at an opposing end of the endwall 74b. The fastener 96c could then be tightened, and then secondary fasteners or some other attachment methodology could be used to secure the floor 70c to the endwall 74c.

Figure 8:
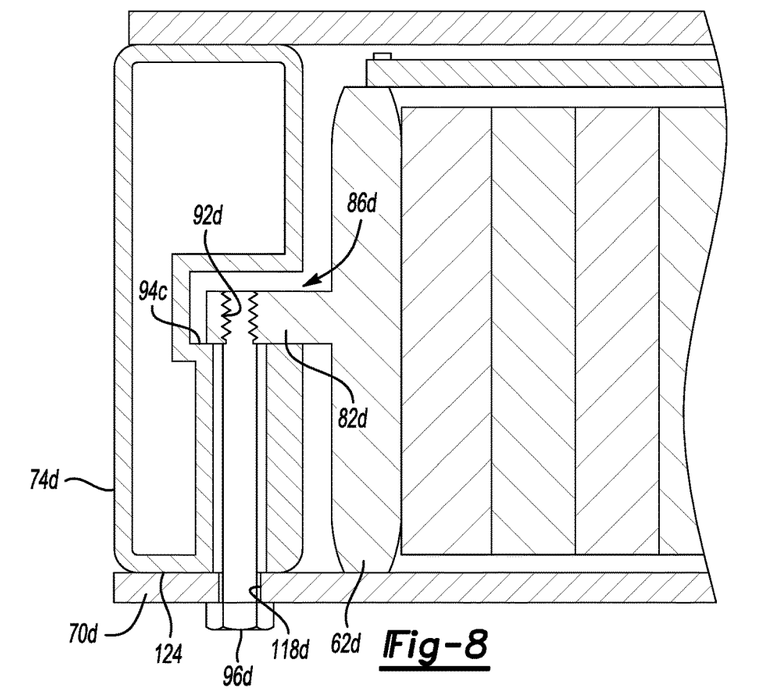
FIG. 8 shows a section view at the position of line 4-4 of a battery pack according to yet another battery pack embodiment.

Referring to FIG. 8, another exemplary embodiment includes a fastener 96d that engages a threaded bore 92d within a flange 82d extending from an endplate 62d. Rotating the fastener 96d into the threaded bore 92d draws the flange 82d against a side 94d of a recess 86d of an endwall 74d to stabilize the endplate 62d relative to the endwall 74d. Notably, the fastener 96d extends through an opening 118d in a floor 70d. Tightening the fastener 96d into the threaded bore 92d can pull the floor 70d upwardly against a surface 124 of endwall 74d. The surface 124 faces downwardly in this example. In the embodiment of FIG. 8, fastening elements other than the fasteners 96d may not be required to secure the floor 70a against the surface 124 of the endwall 74d.

The fastener 96d of the embodiment of FIG. 8 could, in some examples, not hold the floor 70d. The fastener 96d could, for example have its head positioned within an area of the endwall 74d that is subflush the surrounding areas. The head could thus be positioned similarly to the embodiment of FIG. 6 but at an opposing end of the endwall 74d. The fastener 96d could then be tightened, and then secondary fasteners or some other attachment methodology could be used to secure the floor 70d against the surface 124 of the endwall 74d.

Figure 9:
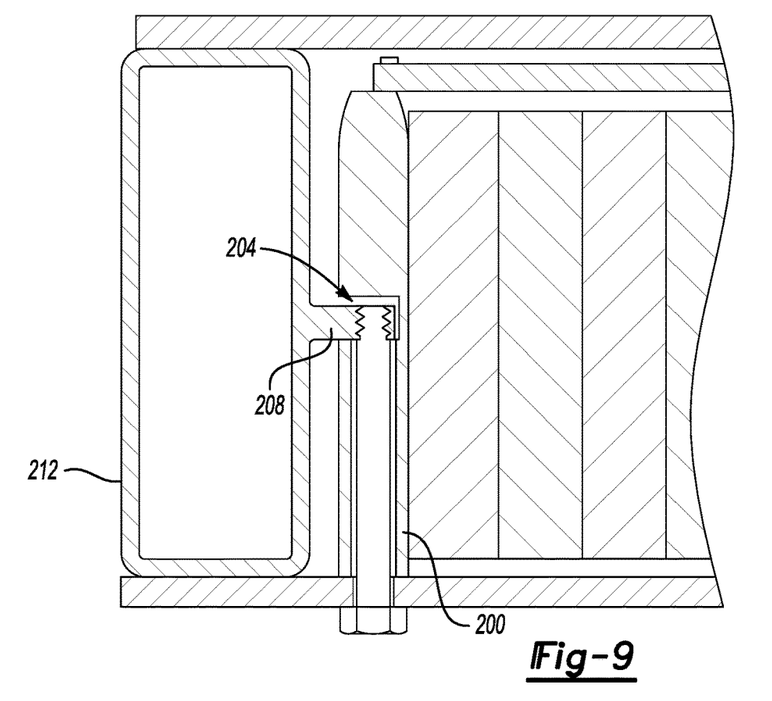
FIG. 9 shows a highly schematic section view of a flange of an endwall received within a recess of an endplate.

The above examples illustrate a flange extending from an endplate into a recess of an endwall. As can be appreciated, as shown in FIG. 9, an endplate 200 could instead provide a recess 204 that receives a flange 208 extending from an endwall 212. That is, the flange within a recess concept is not limited to a flange extending from an endplate into a recess within an endwall.

Features of the disclosed examples include securing an endplate relative to an endwall to hold a battery array within a battery pack enclosure. The securing is accomplished by holding a flange within a recess. The securing approach can utilize less packaging area than other designs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
    an endwall;
    an endplate;
    a flange secured within a recess to secure the endwall relative to the endplate, the flange extending transversely from a primary portion of one of the endwall or the endplate, the other of the endwall or the endplate providing the recess; and
    a fastener extending at least partially within the recess, the fastener securing the flange within the recess,
    wherein the endwall is cast together with a floor of a battery pack enclosure, the endwall and the floor together a single unitary structure, and further comprising a battery pack secured directly to the floor.

2. The battery assembly of claim 1, wherein the endwall provides the recess and the endplate provides the flange.

3. The battery assembly of claim 1, wherein the fastener extends to the flange through an open bore within the other of the endwall or the endplate.

4. The battery assembly of claim 3, wherein the fastener holds a cover or a tray of the battery pack enclosure against the endwall.

5. The battery assembly of claim 3, wherein the fastener is threadably secured directly to a threaded bore within the other of the endwall or the endplate.

6. The battery assembly of claim 3, wherein the fastener extends through an aperture in the flange from a first side of the flange to an opposite, second side of the flange.

7. A battery assembly, comprising:
    an endwall;
    an endplate;
    a flange secured within a recess to secure the endwall relative to the endplate; and
    a fastener extending at least partially within the recess, the fastener securing the flange within the recess,
    wherein the endwall is part of a battery enclosure, and the endplate is a first endplate that sandwiches an array of battery cells together with a second endplate to provide a battery array, wherein the battery enclosure provides an open area to receive the battery array,
    the flange extending transversely from a primary portion of one of the endwall or the endplate, the other of the endwall or the endplate providing the recess,
    wherein a first side of the first endplate interfaces directly with the array of battery cells, and the flange is disposed along an opposite, second side of the first endplate,
    wherein the battery enclosure holds the battery array and a plurality of other battery arrays.

8. The battery assembly of claim 1, wherein the endplate provides the recess, and the fastener is threadably secured to the endplate to secure the flange within the recess.

9. The battery assembly of claim 1, wherein the endwall provides the recess, and the fastener is threadably secured to the endwall to secure the flange within the recess.

10. The battery assembly of claim 1, wherein the endwall provides the recess, and the fastener that secures the flange within the recess extends through an open bore in the endwall.

11. The battery assembly of claim 1, wherein the endplate provides the recess, and the fastener that secures the flange within the recess extends through an open bore in the endplate.

12. A battery assembly, comprising:
    an endwall;
    an endplate;
    a flange secured within a recess to secure the endwall relative to the endplate, the flange extending transversely from a primary portion of one of the endwall or the endplate, the other of the endwall or the endplate providing the recess; a fastener extending at least partially within the recess, the fastener securing the flange within the recess; and
    a battery pack enclosure that includes a cover and a floor secured to the endwall, wherein the flange is configured to be secured within the recess after the cover and the floor are secured to the endwall.

13. The battery assembly of claim 1, wherein the endwall is a first endwall, and further comprising a second endwall, the first endwall and the second endwall clamping a plurality of battery cells.

14. The battery assembly of claim 1, wherein the endplate is a first endplate of a first battery array, wherein the endwall provides the recess having a first portion that receives the flange of the first endplate, wherein a second portion of the recess receives a flange of another second endplate of a second battery array that is separate and distinct from the first battery array.

15. The battery assembly of claim 12, wherein the endplate is a first endplate of a first battery array, wherein the endwall provides the flange having a first portion that is received within the recess of the first endplate, wherein a second portion of the flange is received within a recess of another second endplate of a second battery array that is separate and distinct from the first battery array.

16. The battery assembly of claim 3, wherein the flange is configured to be drawn against a side of the recess as the fastener is secured.

17. The battery assembly of claim 4, wherein the fastener is accessible from outside the battery pack enclosure.

* * * * *